United States Patent [19]

Gibbs

[11] 4,070,794

[45] Jan. 31, 1978

[54] PLANT WATER TROUGH

[76] Inventor: Geraldine L. Gibbs, 7515 Langley, Chicago, Ill. 60619

[21] Appl. No.: 712,587

[22] Filed: Aug. 9, 1976

[51] Int. Cl.² .......................................... A01G 27/00
[52] U.S. Cl. ..................................................... 47/79
[58] Field of Search ................................. 47/66–72, 47/79, 80, 81

[56] References Cited

U.S. PATENT DOCUMENTS

| 1,213,940 | 1/1917 | Parker et al. | 47/66 |
| 2,238,935 | 4/1941 | Gumaer | 47/81 |
| 2,802,305 | 8/1957 | MacNaughton | 47/81 |
| 2,837,868 | 6/1958 | Skerritt | 47/79 |
| 3,084,666 | 4/1963 | Plaisance | 47/39 |
| 3,854,242 | 12/1974 | Gladstein | 47/67 |

FOREIGN PATENT DOCUMENTS

| 838,735 | 3/1939 | France | 47/79 |
| 699,880 | 11/1940 | Germany | 47/80 |
| 1,914,676 | 10/1970 | Germany | 47/79 |
| 7,644 of | 1896 | United Kingdom | 47/71 |

*Primary Examiner*—E. H. Eickholt
*Assistant Examiner*—James R. Feyrer
*Attorney, Agent, or Firm*—Olson, Trexler, Wolters, Bushnell & Fosse, Ltd.

[57] ABSTRACT

A plant water trough is disclosed for providing a humid atmosphere in the immediate vicinity of a potted plant. The trough comprises an upstanding, endless, relatively tall inner wall which defines an enclosed space of a size and shape to accommodate an individual flower pot of common size. The trough further includes a relatively low outer wall radially extending outside the flower pot rim so as to permit water in the trough to evaporate and the humid atmosphere thus created to flow directly upwardly around the flower pot to the plant foliage.

1 Claim, 4 Drawing Figures

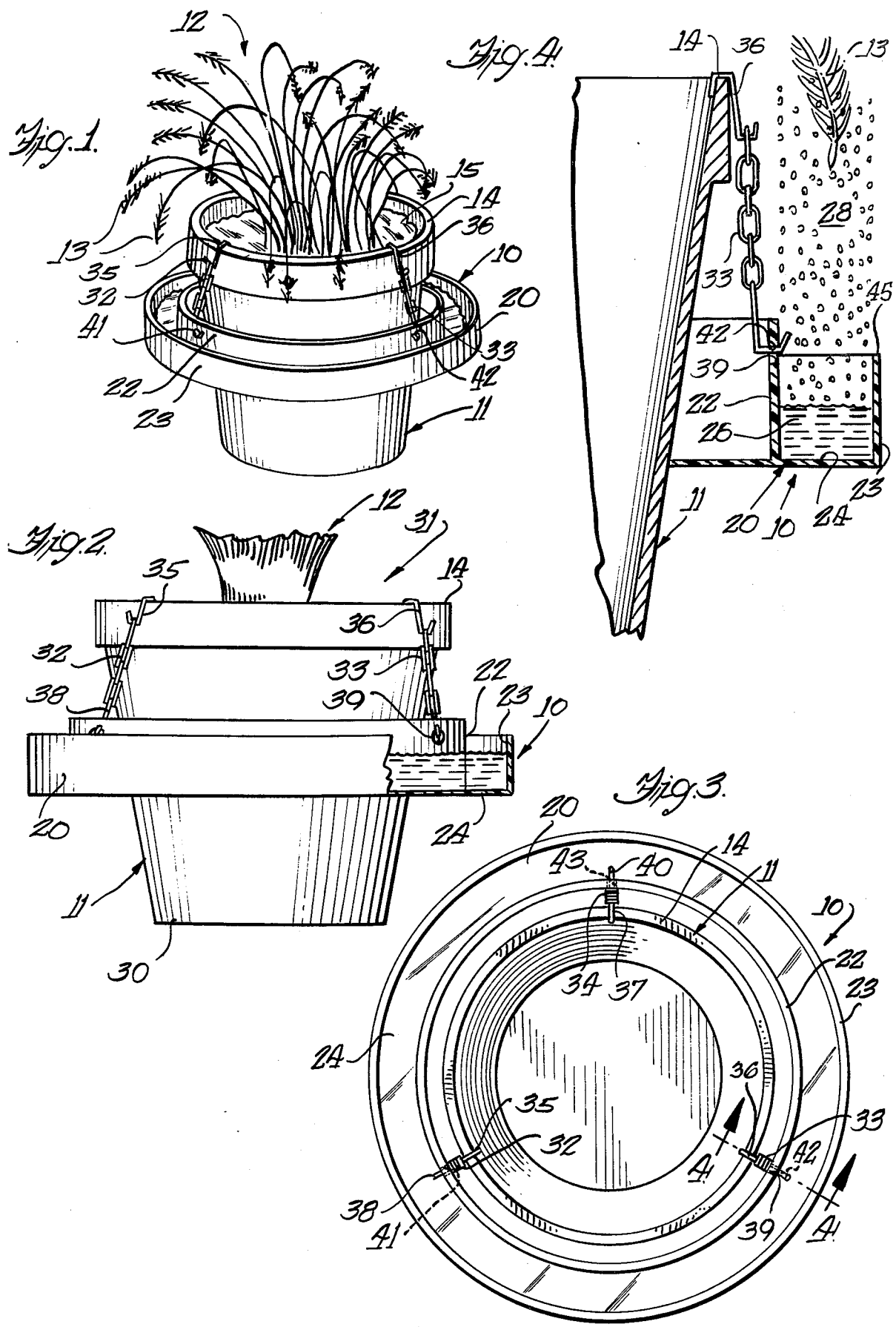

PLANT WATER TROUGH

BACKGROUND OF THE INVENTION

This invention relates generally to humidifying and watering devices, and more particularly concerns a device for providing a relatively humid atmosphere for house plants and the like.

The use and maintenance of house plants in interior decoration has recently enjoyed a dramatic increase in popularity. These plants are used as decorative accessories in a great number of dwellings and commercial establishments.

Many such plants thrive in a relatively humid atmosphere. In some cases, it is desirable to locate a source of moisture near the plants. This moisture source, by evaporation or other process, creates the necessary humidity in the immediate vicinity of the plants without excessively humidifying other areas of the room in which the plants and source are located. Decorative waterfalls, fountains, pools, and the like have been installed adjacent extensive plant arrangements to provide humidity. These devices are, of course, expensive and can require extensive maintenance.

As a less costly solution, those who care for plants are often advised to group plant-containing flower pots together on a tray of moist sand. Water evaporation from the sand provides the humidity desired. Experience has shown, however, that this sand can become dirty, and the sand tray use does not always lend itself to a completely desirable placement of pots and plants.

It is therefore the general object of the present invention to provide a flower water trough for creating a relatively humid atmosphere in the immediate vicinity of house plants to encourage plant growth and vigor.

It is another object to provide a flower water trough which is adapted for use with individual flower pots and the plant each individual pot contains, so as to permit maximum flexibility of pot and plant placement.

Still another object is to provide a flower water trough which can be easily cleaned and maintained in an attractive condition without great effort or expense.

A further object is to provide a flower water trough of the type described which can be offered at modest cost, which is relatively easy to manufacture, and which will prove relatively rugged in use.

A still further object of the invention is to provide such a flower water trough in a shape and of a size which can be conveniently yet attractively and unobstructively used. An associated object is to provide such a flower water trough which will provide humidity as indicated above, yet which will not interfere with normal plant maintenance activities.

Yet another object is to provide a flower water trough which will accomplish the foregoing objects, and which is additionally attractive and novel in appearance.

Other objects and advantages of the invention will become apparent upon reading the following detailed description and upon reference to the drawings. Throughout the drawings, like reference numerals refer to like reference parts.

BRIEF DESCRIPTION OF THE DRAWINGS

FIG. 1 is a perspective view showing the novel plant water trough as it appears in use with a plant contained in a typical flower pot;

FIG. 2 is a side elevational view showing the novel water trough, the pot, and a portion of the plant and part of the trough being broken away to show the invention in further detail;

FIG. 3 is a top plan view of the novel water trough as it appears when used with a typical flower pot, the pot being illustrated in an empty condition; and Fig. 4 is a fragmentary sectional view taken substantially in the plane of line 4—4 in FIG. 3 and showing in yet further detail portions of the novel water trough and associated flower pot and flower.

DETAILED DESCRIPTION

While the invention will be described in connection with the preferred embodiment, it will be understood that it is not intended to limit the invention to this embodiment. On the contrary, it is intended to cover all alternatives, modifications, and equivalents as may be included in the spirit and scope of the invention as defined by the appended claims.

Turning more specifically to the drawings, there is shown a flower water trough 10 embodying the present invention as it appears when used with a flower pot 11 of typical size and shape. Here, this flower pot 11 is of the familiar truncated cone aspect, and accomodates a plant 12 having branches or foliage 13 extending over a pot rim 14; the plant is rooted in a quantity of soil 15. It is in the immediate vicinity of this plant 12 and its foliage 13 that a relatively high atmospheric humidity should be maintained.

In accordance with the invention, the desired humidity is provided by the flower water trough 10. In the illustrated embodiment, this flower water trough 10 includes an endless open topped trough member 20 defined by upstanding inner and outer walls 22 and 23, respectively. To encourage easy trough cleaning, a flat, horizontal bottom member 24 extends between the walls 22 and 23. Other bottom shapes, such as a U-shape, could be provided. If desired, the walls 22 and 23 could be slanted convergingly inwardly and downwardly in a trough V-like cross-sectional shape.

When this trough 10 is filled or partially filled with water 26, the process of water evaporation provides a high-humidity atmosphere 28 which rises above the trough 10 as illustrated particularly in FIG. 4. This high-humidity atmosphere 28 comes into intimate contact with the plant foliage 13, thereby encouraging vigorous plant life and growth. It is another feature of the invention that intimate plant contact with this high-humidity atmosphere 28 is encouraged; to this end, the outer trough wall 23 extends radially outside the pot rim 14 to permit water 26 in the trough 10 to evaporate and the thus humidified air 28 to flow directly upwardly unimpeded around the flower pot 11 to the plant foliage 13.

To permit the trough 10 to be used with an individual pot 11, the inner wall 22 defines an enclosed space of a size and shape to accomodate the individual common flower pot 11, in accordance with yet another aspect of the invention. Here, the pot 11 is round, and the walls 22 and 23 are circular in planar aspect, as illustrated in FIG. 3. If the pot 11 were square, the walls could of course be square or otherwise rectangular in planar aspect. It is a feature of the invention that the inner wall 22 extends to a height greater than the outer wall 23 to provide a splash-plate effect and prevent inadvertent water spillage when the trough's user pours water into the trough 20. A convenient quantity of water can be stored by forming the outer vertical wall 22 to an appropriate height, such as 1¼ inches, and spacing the walls 22 and 23 radially from one another by 1 inch. When used with standard pots, the inner wall circumference can vary from 18 inches to 36 inches. As explained above, the inner wall can extend to a greater height than the outer wall; the illustrated embodiment provides an inner wall having a height of 1½ inches.

In accordance with another feature of the invention, the trough 10 is suspended from a lip 14 of the pot 11 at a level vertically intermediate the pot lip 14 and a pot base 30. When so suspended as indicated in FIG. 2, the trough 10 is positioned to provide a concentration of humid atmosphere to the plant 12 while locating the trough 10 below that space 31 normally used to observe, work and water the plant 12 in the pot 11. To so locate the trough 10, three equiangularly spaced suspension devices are provided; here, the suspension devices take the form of short flexible members such as chains 32, 33, 34 each terminating in a hook 35, 36 and 37 for engagement over the pot rim 14.

At the other end, these chains 32-34 terminate in hooks, eyelets, or similar connectors 38, 39 aand 40. Holes or apertures 41, 42 and 43 are provided in the tall inner wall 22 to accomodate the fasteners 38-40, respectively. In carrying out the invention, these holes 41-43 are located at a point above the rim 45 of the outer wall 23 to prevent inadvertant water spilling through the holes 41-43 from the trough during trough filling. As the trough is filled, the trough user will of course be aware of the height of the water 26 in the trough relative to the rim 45 of the outer wall 23. When the water level reaches the level of the rim 45 and filling is halted, spillage through these holes 41-43 will be averted.

The invention is claimed as follows:

1. A plant water trough, comprising an endless, open-topped trough adapted to contain water and defined by an upstanding, endless relatively tall inner wall of substantially 1½ inches height, and an upstanding, endless, relatively short outer wall of substantially 1¼ inches height spaced substantially uniformly apart from and outside of the inner wall by substantially 1 inch, the inner wall defining an enclosed space of a size and shape larger than an individual common flower pot, both the outer and inner walls radially extending substantially outside a rim of the flower pot to locate the trough in a position spaced apart from the pot and to permit water in the trough to evaporate and the humid atmosphere created thereby to flow directly upwardly along a path of travel spaced horizontally apart from the outside of the flower pot to the foliage of a plant rooted in the pot, and three suspension means members equiangularly spaced about the trough, each suspension member being attached at one end to a hook for engagement over the pot rim, and at another end to a trough attachment means, said trough attachment means engaging said trough through an aperture formed in said inner wall, the aperture being located at a point vertically above the top rim of the outer wall and below the top rim of the inner wall, and the suspension means being of a length to suspend said trough from a lip of the pot at a level vertically intermediate the pot lip and a pot base, thereby providing a concentration of water vapor to the plant foliage while locating the trough at a point below the space used to observe, work and water the plant in the pot and yet providing an invigoratingly moist atmosphere for the plant.

* * * * *